March 6, 1934.    J. E. SEEDERER    1,949,844
WEIGHING DEVICE
Filed Dec. 20, 1929
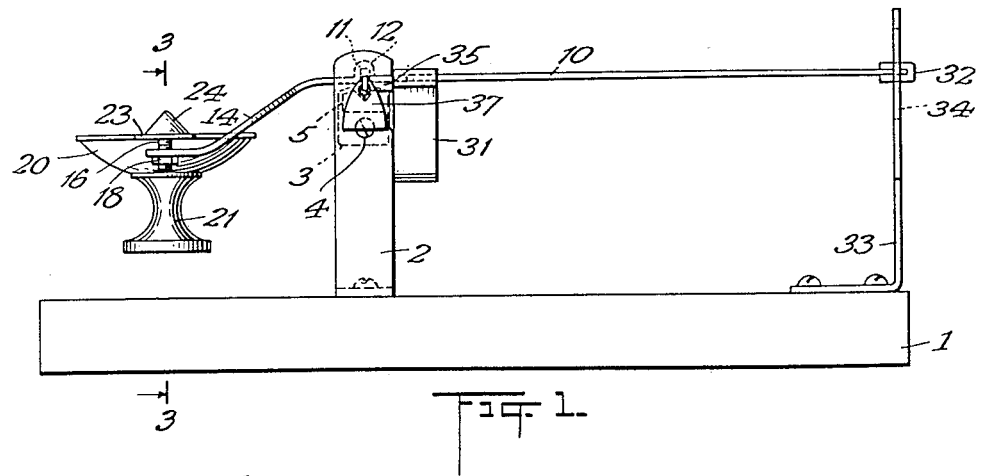
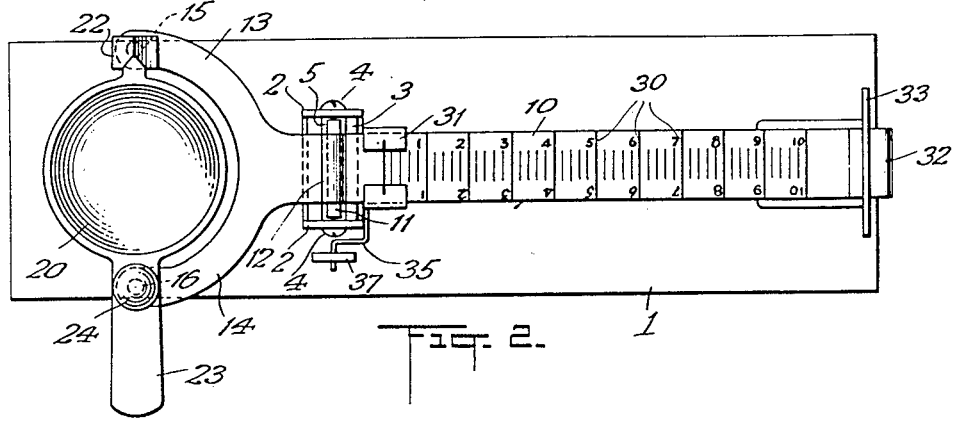
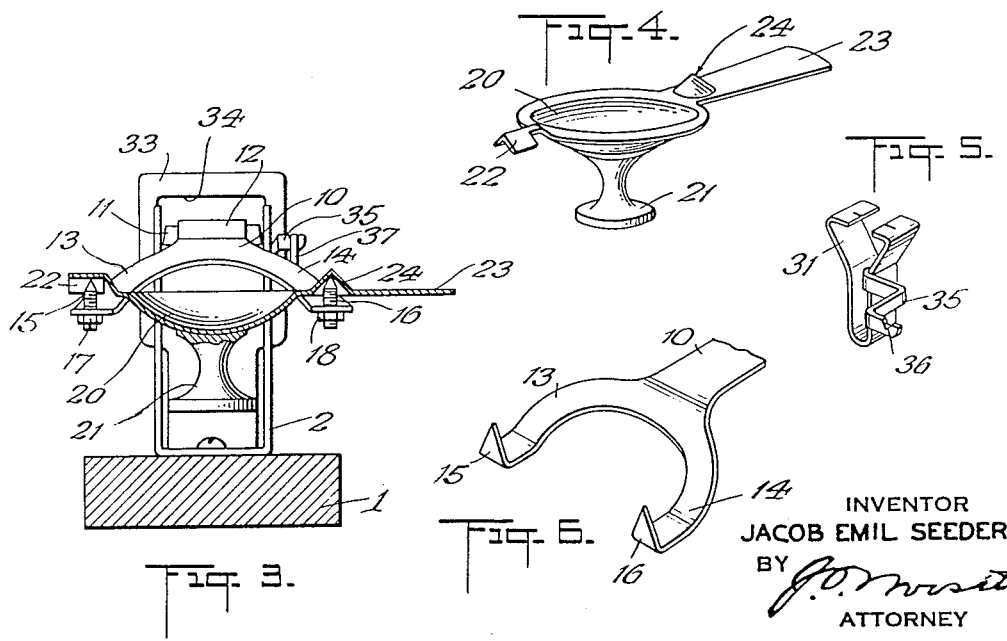
INVENTOR
JACOB EMIL SEEDERER
BY
ATTORNEY Patented Mar. 6, 1934 1,949,844

UNITED STATES PATENT OFFICE 1,949,844

WEIGHING DEVICE

Jacob Emil Seederer, Jersey City, N. J., assignor to Seederer-Kohlbusch, Inc., Jersey City, N. J., a corporation of New Jersey Application December 20, 1929, Serial No. 415,396

3 Claims. (Cl. 265—49)

This invention relates generally to weighing devices and particularly to that class wherein the weighing receptacle is adapted to be removed from the beam of the device. More specifically this invention relates to the so called "alloy" or "proportion" scales particularly adapted for quickly weighing an amount of one material which will bear a predetermined ratio to a previously weighed amount of some other material.

An object of this invention is to provide a weighing device which is accurate, economical to make, and serviceable.

A further object is to provide a weighing device having a removable weighing receptacle adapted to be easily manipulated, stand on its own base, and self centering laterally of the beam of the weighing device.

Another object is to provide a weighing device whereby predetermined proportions of materials can be quickly and accurately weighed without necessarily taking readings of any kind.

A further object is to provide a weighing device whereby a material can be weighed, removed, and an amount of a second material which is to be an exact proportion of the first material can be measured by merely adding a single weight to the device without altering the position of any other weight.

A further object is to provide a device calibrated for the metric, avoirdupois or troy system and convertible to either of the other systems by merely adding a single weight to the beam.

My invention comprises a beam pivoted intermediate its ends, graduated on one side of its pivot and formed into two arms on the opposite side, a receptacle adapted to rest on pivots carried by the arms, said receptacle being provided with novel pivot bearings hereinafter described, a movable weight carried by the graduated part of the beam, the weight cooperating with said graduations, and means carried by the movable weight adapted to hold a removable weight in fixed relation with respect to the movable weight and the same distance from the pivot of the beam as the movable weight is from the zero graduation of the beam.

The invention is more particularly described hereinafter with respect to the drawing.

Referring to the drawing:

Fig. 1 is a side elevation of a scale embodying this invention;

Fig. 2 is a top plan view;

Fig. 3 is a section on line 3—3 of Fig. 1;

Fig. 4 is a perspective view of the weighing receptacle;

Fig. 5 is a perspective view of the movable weight;

Fig. 6 is a perspective view of one end of a modified beam.

In the device illustrated in the drawing, 1 is a base on which is mounted the U-shaped bracket 2 having bridge member 3 secured therein by means of screws 4. Set in the bridge member 3 is knife edge bearing 5, preferably made of agate. Beam 10 is pivotally mounted by means of the knife edge pivot 11, wedged or soldered in the crimped portion 12 of beam 10, resting in the knife edge bearing 5.

As shown in Figs. 2 and 3, the beam 10 on one side of its pivot 11 is bifurcated into two arms 13 and 14 carrying pivots 15 and 16 threaded therein and held in position by lock nuts 17 and 18, respectively. Instead of having the pivots 15 and 16 as separate parts, they may be formed as an integral part of the beam 10 as shown in Fig. 6.

A weighing pan 20 is adapted to be carried on the pivots 15 and 16. The pan has a weighted base 21 to lower its center of gravity and also to enable it to stand upright when not on the beam. This pan 20 has two oppositely disposed laterally extending members 22 and 23, preferably made integral therewith. Member 22 is peaked to form a bearing surface for pivot 15 along a line parallel to the axis of the pivot of the beam. Member 23 extends laterally from the pan far enough to provide a convenient handle to manipulate the pan and has a cone shaped depression 24 stamped in the underside thereof. This depression 24 forms the bearing for pivot 16 and is an important feature of the present invention because, when the pan is placed on the pivots 15 and 16, the cone shaped depression engages the pivot 16 and automatically centers the pan laterally with respect to the beam 10 and also holds the pan centered against minor jolts to the device. The accurate positioning of the pan longitudinally of the beam is provided for by the cooperation of pivots 15 and 16 with the member 22 and the cone shaped depression 24 of member 23, respectively. The pan 20 and members 22 and 23 are preferably a one piece stamping mounted on weighted base 21.

The beam 10 on the opposite side of the pivot 11 from the pan 20 is provided with graduations 30. A movable weight 31, adapted to slide along said beam, is disposed thereon and cooperates with said graduations 30 which may represent any standard units of weight. A counterweight 32 is fixed on the end of the beam 10.

A bracket 33 provided with a cut out portion 34 is mounted adjacent one end of base 1, the distance between said bracket 33 and U-shaped bracket 2 being such that the end of beam 10 extends through the cut out portion 34 and slightly beyond bracket 33. This bracket 33 serves to limit movement of the beam 10 and also may carry a horizontal line to indicate at what height the end of beam 10 should be when the beam is exactly balanced.

It will be understood that the device, as described, may be used for straight weighing of materials, the materials being placed in pan 20 and balanced by sliding weight 31 along the beam.

To particularly adapt the device of the present invention for use in quickly and accurately weighing a material which must bear a predetermined relation to some material previously weighed, as is the usual case in making teeth filling alloys and analogous work, the movable weight 31 carries a hook member 35, preferably soldered or welded thereto, having a knife edge 36 at the outer end thereof adapted to carry a removable weight 37. The particular shape of hook member 35 is not important but it must extend away from beam 10 sufficiently to avoid the support for said beam and it must extend along beam 10 toward the pivot 11 thereof just sufficiently so that, when the movable weight 31 is at the zero graduation on the beam, the knife edge 36 carried by the hook member 35 will be exactly opposite the pivot 11 of the beam as clearly shown in Fig. 2.

The mass of removable weight 37 is made such that, when hung on the knife edge 36 with the weight 31 at a certain position on the beam, it will increase the load in pan 20 required to balance the beam a predetermined amount above the load in pan 20 required to balance the beam without weight 37 but with weight 31 in the same position. As the position of weight 37 when disposed on knife edge 36, bears a fixed relation to weight 31, if it increases the load in pan 20 required to balance the beam a certain amount with the weight 31 at any particular graduation, it will also increase the load in pan 20 required to balance the beam the same proportion with the weight 31 at any other graduation of the beam except at the zero graduation. With the weight 31 at the zero graduation, addition or removal of weight 37 will not disturb the balance of the beam at all inasmuch as the knife edge 36 is exactly opposite pivot 11 at this position of weight 31.

Where ingredients are being measured by this device in only a single proportion, it will be only necessary to have a single removable weight 37. For example, if two ingredients are to be measured only in the proportion of 1 of A to 1½ of B, a single weight 37 would be sufficient, the mass of that weight being such that, when disposed on knife edge 36, it would require 1½ times the load balanced by weight 31 alone to now balance the beam. The operation of the scale to measure a mixture of A and B in the above proportions would be as follows: A convenient amount of A would be placed in the pan 20 and balanced by moving weight 31 out on the beam, pan 20 would then be removed, ingredient A dumped into the mixing vessel, and pan 20 replaced; weight 37 would then be placed on knife edge 36 without altering the position of weight 31 and ingredient B would then be poured into pan 20 until the beam is balanced. The weight of ingredient B would be exactly 1½ times the weight of ingredient A regardless of where weight 31 had to be moved along the beam to balance the weight of A. This simplified method of getting definite proportions is obviously easier than weighing the number of grams of A, multiplying that number by 1½ and then weighing that amount of B out. In dental and analogous work, the exact proportions are necessary but the total weight of the mixture is generally unnecessary. Where the total weight of the mixture must be known, of course, the actual weight of ingredient A would have to be noted by the position of weight 31 on the beam.

Ordinarily a series of weights 37 would go with each scale to enable various proportions to be measured. For instance, a series of ten weights could go with the scale, the lightest when disposed on the knife edge 36 of the hook member 35 measuring an amount of B $\frac{1}{10}$ greater than the weight of A, the next weight $\frac{2}{10}$ greater, etc.; instead of measuring amounts of B merely a fraction greater in weight than the weight of A, the series of weights could be made larger and measure amounts of B weighing 2, 3, 4, etc. times the weight of A.

As stated above, the removable weight 37 when disposed on the knife edge 36 will not disturb the balance of beam 10 while the movable weight 31 is at the zero graduation since the knife edge 36 is exactly opposite pivot 11 of the beam. However, when the movable weight is moved along the beam to the right (looking at Figs. 1 and 2), the weight 37 will, of course, exert a downward force on the weight side of the beam as well as weight 31, but it will have a smaller moment than a weight of equal mass would if applied to the beam at the point at which weight 31 rests because the distance from the pivot of the beam to weight 37 is less than the distance from the pivot of the beam to weight 31.

For this reason the weight 37 will not bear the same relation to weight 31 as the difference in weight between a load balanced by weight 37 and weight 31 together and a load balanced by weight 31 alone will bear to the load balanced by weight 31 alone. Weight 37 will be a slightly greater fraction of weight 31, depending on the difference in distance of weights 31 and 37 from the pivot of the beam 10 which in turn depends on the distance of the zero graduation on the beam from its pivot. The weight 37 must, of course, be determined by actual trial.

In the present device it is necessary that the position of weight 37 must be fixed with respect to weight 31 and that weight 37 must be opposite the pivot of the beam when weight 31 is on the zero graduation of the scale, but the distance between the zero graduation and the pivot of the beam may be varied. For example, the zero graduation may be exactly at the pivot of the beam in which case weight 37 and weight 31 will be the same distance, longitudinally of the beam, from the pivot. Such an arrangement, although operative, would not generally be used due to the difficulty of moving weight 31 all the way to the pivot of the beam. The zero graduation would usually be positioned about as shown in the drawing.

In this device, the movable weight 31 and the graduations on beam 10 may be calibrated in the metric system and yet straight weighings may be taken in the avoirdupois or troy system by placing on knife edge 36 a removable weight 37 whose mass is so proportioned that weights 31 and 37 together will counterbalance a unit of weight in the avoirdupois or troy system where the weight 31 alone at the same graduation would counterbalance a unit of weight in the metric system. Similarly, the weight 31 and graduations on beam 10 can be calibrated for the avoirdupois or troy system and converted to the other system or the metric system. In every case the conversion must be to a greater unit of weight inasmuch as mass is being added to the counterbalancing weight and not subtracted.

The invention claimed is:

1. A removable weighing receptacle comprising a weighted base and a pan mounted thereon having a pair of oppositely disposed and laterally extending members, a portion of each member being shaped to provide a bearing for an upright pivot, and one of said members extending laterally beyond its bearing sufficiently to form a handle.

2. The combination of a pivotally supported beam formed into two arms on one side of its point of pivotal support, a pair of upright pointed pivots carried by said arms, a removable self centering weighing receptacle adapted to rest on said pivots, said receptacle comprising a weighted base and a pan mounted thereon having a pair of oppositely disposed and laterally extending members, a portion of each member being shaped to provide a bearing for one of said pivots, one of said bearings being cone-shaped, one of said members extending laterally beyond its bearing sufficiently to form a handle, and counterbalancing means carried by said beam on the opposite side of its point of pivotal support.

3. A removable weighing receptacle comprising a weighted base and a self centering pan mounted thereon having a pair of oppositely disposed and laterally extending members, a portion of each member being shaped to provide a bearing for an upright pointed pivot, one of said bearings being cone-shaped, the other being shaped to provide a longitudinal bearing surface, and one of said members extending laterally beyond its bearing sufficiently to form a handle.

JACOB EMIL SEEDERER.